US006113821A

United States Patent [19]

Radzimanowski

[11] Patent Number: 6,113,821

[45] Date of Patent: Sep. 5, 2000

[54] PROCESS FOR PRODUCING WOOD FIBRES

[75] Inventor: Klaus E. Radzimanowski, Krefeld, Germany

[73] Assignee: Schenkmann & Piel Verfahrenstechnik GmbH & Co. KG, Leverkusen, Germany

[21] Appl. No.: 08/945,650

[22] PCT Filed: Mar. 26, 1996

[86] PCT No.: PCT/DE96/00569

§ 371 Date: Oct. 31, 1997

§ 102(e) Date: Oct. 31, 1997

[87] PCT Pub. No.: WO96/34726

PCT Pub. Date: Nov. 7, 1996

[30] Foreign Application Priority Data

May 3, 1995 [DE] Germany ........................... 195 15 734

[51] Int. Cl.[7] ............................ B29C 67/04; B29C 59/02

[52] U.S. Cl. ....................... 264/37.17; 264/115; 264/118; 264/125

[58] Field of Search .................................... 264/115, 109, 264/112, 113, 118, 121, 123, 125, 37.17, 37.1

[56] References Cited

U.S. PATENT DOCUMENTS

| | | | |
|---|---|---|---|
| 4,136,831 | 1/1979 | Cederquist | 241/18 |
| 4,855,179 | 8/1989 | Bourland et al. | 264/115 |
| 5,482,666 | 1/1996 | Larsson | 264/115 |
| 5,554,330 | 9/1996 | Flannery et al. | 264/115 |
| 5,624,616 | 4/1997 | Brooks | 264/115 |
| 5,637,326 | 6/1997 | Bogue et al. | 264/115 |
| 5,725,818 | 3/1998 | Troughton et al. | 264/115 |

*Primary Examiner*—Angela Ortiz
*Attorney, Agent, or Firm*—Diller, Ramik & Wight

[57] ABSTRACT

In order to save energy and reduce the exhaust air volume in the production of wood fibers from wood chips, it is proposed to add unsaturated hot steam to the saturated steam used to plasticize the timber binders and soften the wood fibers in a closed-cycle process.

14 Claims, 1 Drawing Sheet

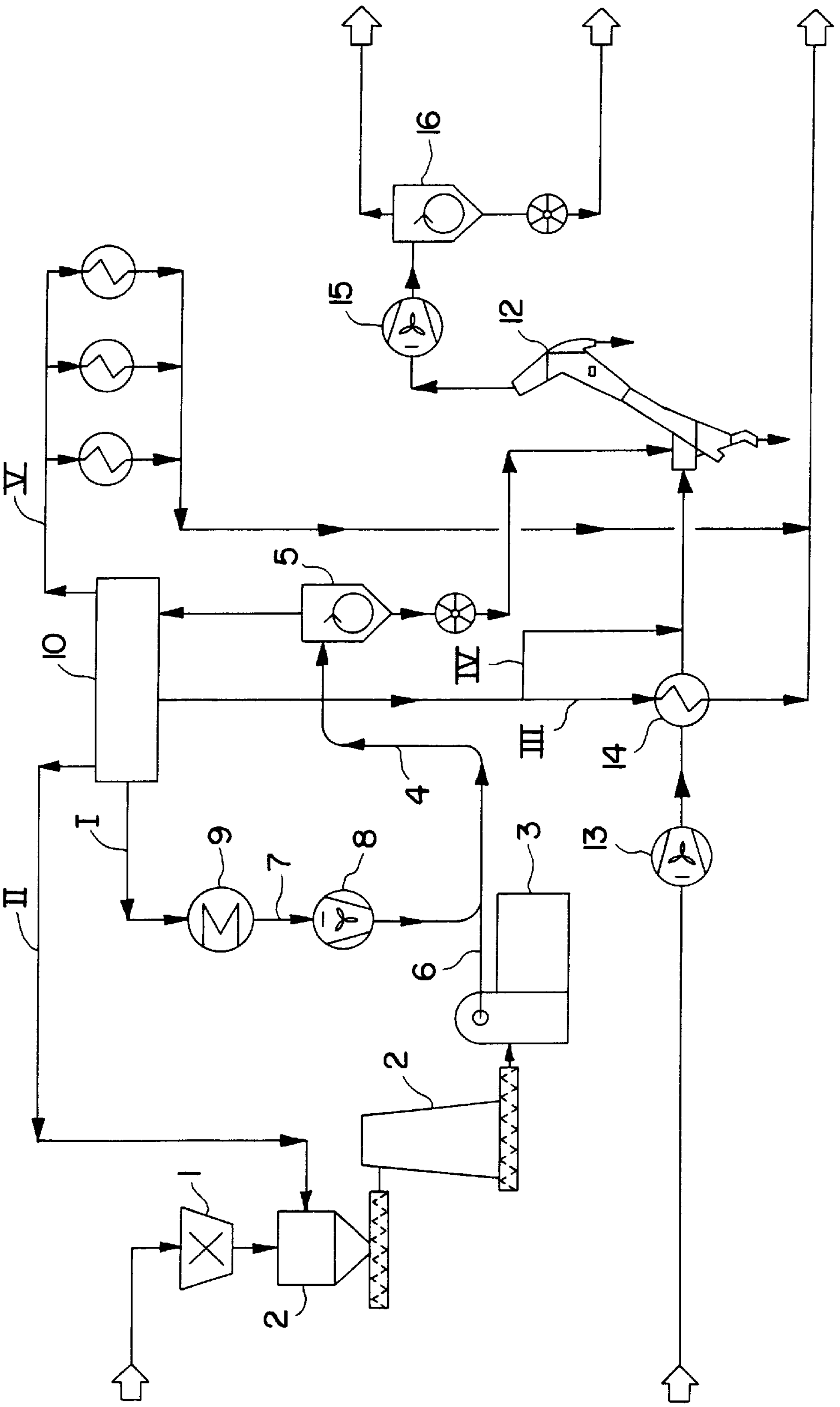
1
2
2
3
4
5
6
7
8
9
10
12
13
14
15
16
I
II
III
IV
V

PROCESS FOR PRODUCING WOOD FIBRES

BACKGROUND OF THE INVENTION

The invention relates to a process for producing fibreboard from wood fibres, in which comminuted wood particles in the form of wood chips are treated with saturated steam under the application of pressure and heat in order to reduce the binding strength of the timber binders, the wood chips treated in this manner are comminuted in a mill to obtain wood fibres, the saturated steam/fibre mixture is fed to a first separator or separator group to separate the wood fibres from the gaseous transport medium while undergoing drying and the admixing of a glue-like binder, and the separated wood fibres are, possibly following the renewed admixing of a gaseous transport medium and additional processing steps, such as bin storage, sifting and/or separation of the wood fibres from the transport medium in a second separator, fed to a moulding and pressing line for production of the fibreboard.

In contrast to pressed particle board, bonded fibreboard made of wood fibres exhibits considerably greater strength, greater homogeneity and improved workability.

According to the prior art, the wood fibres for the production of fibreboard are obtained by comminuting raw wood into wood chips in a hog.

Possibly following preheating, the wood chips are subsequently treated with saturated steam, where the saturated steam is at a pressure of between roughly 7 and 10 bar and a temperature of roughly 140 to 170° C. This steaming process plasticises the natural timber binders, such as resins or lignin, thus reducing their binding strength. This steaming process also softens the bonded wood fibres.

Following this pretreatment, the wood chips are fiberised in a mill containing saturated steam and the actual fibres are obtained in the form of thin, fine threads.

The saturated steam/fibre mixture is then blown through pipes to a so-called flow dryer, where, under reduced treatment pressure if necessary, liquid glue is injected and the wet steam is mixed with hot air at a temperature of, for example, 170° C.

By absorbing the steam components of the wet steam, the added air cools down relatively drastically, drying the wood fibres, this resulting in a steam/air mixture with a relative humidity of about 40% and a dew point of approx. 50° C.

This mixture, which is relatively dry in comparison with the wet steam, is then fed to one or more cyclones in order to separate out the wood fibres. In the separator, the hot air is blown to the outside, while the heavier fibres are discharged through the bottom.

Following any necessary further processing steps, the fibres obtained in this way can now be fed to a moulding and pressing line where the fibreboard is produced by hardening the glue.

Further treatment steps for the wood fibres may include, for example, bin storage, sifting with the help of a sifter and renewed separation in a separator situated downstream of the sifter.

Due to the high volume flow of hot air required, the known production process is very energy-intensive, particularly since the air serving as transport medium is discharged into the open as exhaust air after the first separator, where it may be necessary to filter dust or toxic particles out of the exhaust air with the help of costly filter installations.

In this process, the exhaust gas cools down so drastically that it is no longer practical in most cases to utilise the energy of the remaining heat content.

For this reason, additional energy sources must be provided in the production process described, which are responsible, for example, for the preheating of the wood chips or the preheating of the sifter air.

SUMMARY OF THE INVENTION

The invention is based on the task of devising a similar type of production process in which the energy consumption is reduced.

This task is solved according to the invention in that hot steam is added to the saturated steam/fibre mixture for the purpose of drying and transportation.

For the purposes of this patent application, the term saturated steam or wet steam refers to a steam state corresponding to the wet steam range of the known steam tables. Unsaturated steam which is capable of absorbing additional steam and approaches the wet steam range is referred to as hot steam or superheated steam.

With the process according to the invention, the addition of dry hot air to the saturated steam/fibre mixture can initially be dispensed with, because the unsaturated hot steam now added is capable of drying the saturated steam/fibre mixture and can also take over the function of transporting the mixture through the pipes.

As the hot steam now generated is under pressure, it is necessary to design the first separator as a pressure-resistant cyclone. Following the separation of the fibres from the vaporous transport medium, the superheated steam is extracted from this cyclone and fed to a distributor, from where it can be put to various uses, thus conserving energy.

The quantity and the state variables of the hot steam added in accordance with Patent Claim 1 are preferably selected such that the saturated steam initially present is completely converted to the hot steam state.

As a result of the conversion of the previously open process to a closed circuit, exhaust gas volumes which must be cleaned in a costly process involving energy loss are no longer generated after the first separator. On the contrary, a large portion of the hot steam is fed, while undergoing renewed superheating in a heat exchanger, by means of a fan from the distributor chamber to the saturated steam/fibre mixture, where it dries the corresponding mixture and takes over the function of transporting it.

As a result of the energy added in the heat exchanger, an additional partial flow of hot steam can, according to the invention, be extracted to preheat the wood chips, for example, so that a corresponding amount of energy can also be conserved at this stage. An additional partial flow can, if necessary, be extracted to preheat the sifter air or directly added to the sifter air, whereupon the moisture content of the air in the sifter increases, so that the fibres to be sifted become hotter and the processing times in the pressing line are correspondingly reduced.

BRIEF DESCRIPTION OF THE DRAWING

The single FIGURE of drawing illustrates a schematic flow diagram for the production of fibre board in accordance with the invention.

DESCRIPTION OF THE PREFERRED EMBODIMENTS

The remaining surplus energy possibly still present can be used in still another partial flow to heat the process water, the building or for other heating purposes.

An example of the invention is illustrated in a flow diagram.

In order to produce wood fibres for the production of fibreboard, raw wood is first comminuted in hog 1 and the resulting wood chips are fed to autoclave 2. In the interior of autoclave 2, the wood chips are treated by batches with saturated steam at a pressure of approx. 8 bar and a temperature of approx. 150° C. The steam treatment plasticises the timber binders and softens the wood fibres.

After the wood chips have been steamed, they are fed to mill 3, to which saturated steam is also applied and in which the softened chips are fiberised with the help of suitable grinding units and the fine wood fibres are exposed.

The pressurised saturated steam/wood fibre mixture is then fed via pipe 4 to the first separator 5 acting as a cyclone, where the wood fibres are separated from the transport medium.

Liquid glue, which coats the wood fibres transported in the saturated steam, can be fed into pipe 4 beforehand via feed line 6 downstream of mill 3, and superheated steam, which has passed through heat exchanger 9 for superheating, can be blown into pipe 4 via feed pipe 7 with the help of fan 8.

The state variables and the quantity of the hot steam added are selected such that the saturated steam is converted to superheated hot steam while drying the wood chips.

The superheated hot steam, which is fed together with the glue-coated wood fibres to the first separator 5, leaves the separator while still in a superheated state and reaches distributor chamber 10, where several partial flows can be extracted. The largest partial flow I is fed to heat exchanger 9 mentioned previously, where it is superheated and, as described previously, blown into pipe 4 with the help of fan 8.

A second partial flow II is fed via pipe 11 to hog 1 and serves to preheat the wood chips.

The fibre material removed in the first separator 5 is subsequently transferred to sifter 12, where coarse pieces of wood and lumps of glue are sifted out and removed from the process as so-called tailings.

The air required for sifting is fed to heat exchanger 14 by means of fan 13, where heat exchanger 14 is supplied with heat to preheat the air by a third partial flow III which is extracted from distributor chamber 10. A fourth partial flow IV is fed directly to the heated air blown into sifter 12 and serves to increase the moisture content in sifter 12. The temperature of the sifted wood fibres can be increased for this reason.

After passing through sifter 12, the air/wood fibre mixture is fed with the help of fan 15 to a second separator 16, which the heated air leaves as exhaust air, while the separated wood fibres can be extracted as useful material and transferred to a moulding and pressing line for further processing.

If the process energy is managed accordingly, an additional partial flow V can be extracted from distributor chamber 10 and used, for example, to heat the shop or the process water.

In the process described, one or more of the partial flows marked with Roman numerals can be fed to a wet scrubber not shown in the diagram, where accumulating impurities can be removed.

Energy savings of roughly 50 percent compared to the prior art are possible with the process described above.

Although a preferred embodiment of the invention has been specifically illustrated and described herein, it is to be understood that minor variations may be made in the apparatus without departing from the spirit and scope of the invention, as defined the appended claims.

What is claimed is:

1. In a process of producing fibreboard by treating comminuted wood particles in the form of wood chips with saturated steam under heat and pressure, comminuting the saturated steam treated wood chips in a mill to produce wood fibres, feeding the saturated steam/fibre mixture to at least a first separator for separating the wood fibres from the gaseous transport medium while undergoing drying and admixing glue therewith, feeding the separated wood fibres/admixed glue to a moulding and pressing line for producing fibreboard therefrom, the improvement comprising adding superheated steam to the saturated steam/fibre mixture between the mill and the at least first separator, generating the superheated steam in a heat exchanger, and blowing the superheated steam by a fan into a pipe through which the saturated steam/fibre mixture is fed from the mill to the at least first separator.

2. Process as per claim 1, characterised in that the saturated steam is converted to the superheated steam state by the addition of superheated steam.

3. Process as per claim 1, characterised in that, downstream of the at least first separator (5), the superheated steam is fed to a distributor chamber (10), from which at least one partial flow I, which is superheated in a heat exchanger (9), is extracted in order to be returned to the saturated steam/fibre mixture.

4. Process as per claim 3, characterised in that a partial flow II of the superheated steam is extracted from the distributor chamber (10) in order to preheat the wood chips.

5. Process as per claim 3, characterised in that a partial flow III of the superheated steam is extracted from the distributor chamber (10) in order to preheat the sifter air.

6. Process as per claim 3, characterised in that a partial flow IV of the superheated steam is extracted from the distributor chamber (10) in order to be mixed with the sifter air.

7. Process as per claim 3, characterised in that a partial flow V of the superheated steam is extracted from the distributor chamber (10) in order to heat one of (a) water utilized in the fibreboard producing process, (b) a building and (c) at least one heat exchanger.

8. Process as per claim 2, characterised in that, downstream of the first separator (5), the superheated steam is fed to a distributor chamber (10), from which at least one partial flow I, which is superheated in a heat exchanger (9), is extracted in order to be returned to the saturated steam/fibre mixture.

9. Process as per claim 4, characterised in that a partial flow III of the superheated steam is extracted from the distributor chamber (10) in order to preheat the sifter air.

10. Process as per claim 4, characterised in that a partial flow IV of the superheated steam is extracted from the distributor chamber (10) in order to be mixed with the sifter air.

11. Process as per claim 5, characterised in that a partial flow IV of the superheated steam is extracted from the distributor chamber (10) in order to be mixed with the sifter air.

12. Process as per claim 4, characterised in that a partial flow V of the superheated steam is extracted from the distributor chamber (10) in order to heat one of (a) water utilized in the fibreboard producing process, (b) a building and (c) at least one heat exchanger.

13. Process as per claim 5, characterised in that a partial flow V of the superheated steam is extracted from the distributor chamber (10) in order to heat one of (a) water utilized in the fibreboard producing process, (b) a building and (c) at least one heat exchanger.

14. Process as per claim 6, characterised in that a partial flow V of the superheated steam is extracted from the distributor chamber (10) in order to heat one of (a) water utilized in the fibreboard producing process, (b) a building and (c) at least one heat exchanger.

* * * * *